(12) United States Patent
Aoki et al.

(10) Patent No.: US 7,386,506 B2
(45) Date of Patent: Jun. 10, 2008

(54) FRAUD SCORE CALCULATING PROGRAM, METHOD OF CALCULATING FRAUD SCORE, AND FRAUD SCORE CALCULATING SYSTEM FOR CREDIT CARDS

(75) Inventors: Osamu Aoki, Tokyo (JP); Mikinori Seita, Tokyo (JP)

(73) Assignee: Intelligent Wave Inc. (JP)

( * ) Notice: Subject to any disclaimer, the term of this patent is extended or adjusted under 35 U.S.C. 154(b) by 917 days.

(21) Appl. No.: 10/747,042

(22) Filed: Dec. 30, 2003

(65) Prior Publication Data

US 2004/0225520 A1    Nov. 11, 2004

(51) Int. Cl.
G06Q 40/00    (2006.01)
(52) U.S. Cl. .......................................... 705/38; 705/39
(58) Field of Classification Search .................. 705/38, 705/39, 42
See application file for complete search history.

(56) References Cited

U.S. PATENT DOCUMENTS 5,745,654 A * 4/1998 Titan ............................ 706/20
2003/0220860 A1 * 11/2003 Heytens et al. ............... 705/35

OTHER PUBLICATIONS

W K Leung, K K Lai., Improving the quality of the credit authorization process: A quantitative approach, International Journal of Service Industry Management. Bradford: 2001. vol. 12, Iss. 3/4; p. 328-341.*
Neural Technologies: Neural Techonologies launches Decide credit risk scoring into US financial market, Jun. 17, 1999, M2 Presswire, p. 1-2.*
Raymond L. Rusnak, Consumer credit-scoring: are there lessons for commercial lenders?, Jul. 1994, Journal of Commercail Lending, v76, p. 1-5.*
Providers take Different Approaches To Reducing Internet Card Fraud, Aug. 23, 2000, Card News, v15, p. 1-5.*
Course on Bayesian Networks, Intelligent Wave, Inc., Dec. 10-13, 2002.
Hugin Expert, Course on Bayesian Networks, Dec. 10-13, 2002.

* cited by examiner

*Primary Examiner*—Hani M. Kazimi
*Assistant Examiner*—Gregory Johnson
(74) *Attorney, Agent, or Firm*—Bacon & Thomas, PLLC

(57) ABSTRACT

A fraud score calculating program primarily for use in determining the possibility of credit card fraud can calculate a score reflecting the reliability of a model created based on Bayesian theory. Various factors are extracted from authorization data, and cases are selected for various combinations of the factors. A fraud score is calculated for each case, and a result of score calculation is specified using at least one of the calculated scores. The result of score calculation may be an average of a plurality of the calculated scores. When each score reflects reliability, the result of score calculation may be the largest of the calculated scores.

9 Claims, 11 Drawing Sheets

FIG. 4

| CASE | CORRESPONDING NUMBER OF SAMPLES | CORRESPONDING NUMBER OF FRAUDS |
|---|---|---|
| CASE 1 | 1,000 | 3 |
| CASE 2 | 100 | 1 |
| CASE 3 | 10 | 0 |
| CASE 4 | 15 | 0 |
| CASE 5 | 150 | 2 |
| CASE 6 | 12 | 1 |
| . . . | . . . | . . . |
| CASE n-1 | 500 | 1 |
| CASE n | 250 | 0 |

FIG. 5

| CASE | FACTOR A | FACTOR B | FACTOR C |
|---|---|---|---|
| CASE 1 | A-1 | | |
| CASE 2 | A-1 | B-1 | |
| CASE 3 | A-1 | B-1 | C-1 |
| CASE 4 | A-1 | B-1 | C-2 |
| CASE 5 | A-1 | B-2 | |
| CASE 6 | A-1 | B-2 | C-1 |
| . | . | . | . |
| . | . | . | . |
| . | . | . | . |
| CASE n-1 | A-5 | B-4 | C-1 |
| CASE n | A-5 | B-4 | C-2 |

FIG. 6

| FACTOR | A |
|---|---|
| 1 | ~¥10,000 |
| 2 | ¥10,000~¥50,000 |
| 3 | ¥50,000~¥100,000 |
| 4 | ¥100,000~¥200,000 |
| 5 | ¥200,000~ |

| FACTOR | B |
|---|---|
| 1 | 0:00~6:00 |
| 2 | 6:00~12:00 |
| 3 | 12:00~18:00 |
| 4 | 18:00~24:00 |

| FACTOR | C |
|---|---|
| 1 | MALE |
| 2 | FEMALE |

FIG. 8

| CASE | FACTOR A | FACTOR B | FACTOR C |
|---|---|---|---|
| CASE 1 | A—1 | | |
| · | | B—2 | |
| · | | | C—1 |
| CASE 5 | A—1 | B—2 | |
| · | A—1 | | C—1 |
| · | | B—2 | C—1 |
| CASE 6 | A—1 | B—2 | C—1 |

FIG. 10

$$X = \frac{\frac{1}{2} + D}{C + 1} \times \left[ 1 - \frac{\alpha}{A} \right] \times \left[ 1 - \frac{\beta}{B} \right] \times 1000$$

FRAUD SCORE CALCULATING PROGRAM, METHOD OF CALCULATING FRAUD SCORE, AND FRAUD SCORE CALCULATING SYSTEM FOR CREDIT CARDS

BACKGROUND OF THE INVENTION

1. Field of the Invention

This invention relates to a fraud score calculating program, which is effective in preventing a decrease in reliability due to the selection of inappropriate items in the calculation of a score using a model created based on Bayesian theory in the determination of fraud primarily in the use of credit cards and the like, a fraud score calculating method, and a fraud score calculating system for credit cards using the fraud score calculating program.

2. Description of the Related Art

Customarily, when a credit card is used, in order to prevent fraudulent transactions such as by a third party who has found the credit card and pretends to be the owner, the store or the like where the card is being used checks with the credit card company to ascertain the credit card balance as well as to conduct a credit inquiry concerning fraudulent use. In a system for such credit inquiry, it is becoming important to perform highly reliable determination using data on past fraudulent use and the like.

At present, credit card companies use a system which automatically determines a score for the possibility of fraudulent use on the basis of authorization data (data which is sent from the store or the like concerning the owner of the credit card, the monetary value of the transaction which is requested, etc.). In such systems, typically a score is determined by use of a scoring system which utilizes a neural network using neural theory (see Nonpatent Document 1).

A neural network is leading-edge technology which models the structure and information processing function of nerve cells of the human brain. Constructing such a system requires special know-how and a large monetary investment. Accordingly, many credit card companies do not themselves construct a basic system for score determination, but instead typically introduce a general purpose external system for portions relating to a neural network.

However, a scoring system using a neural network has problems, in that the logic for making a determination is a black box, so that the basis of determination is unclear to the credit card company or the like which utilizes it. In addition, as the user such as the credit card company does not itself create the neural network, difficulty is encountered in reflecting trends from the authorization data for that company. A conceivable measure for coping with such problems is to construct, in place of a neural network, a scoring system using a Bayesian network which uses Bayesian theory, which has recently come into use in the fields of artificial intelligence and the like. The basis of Bayesian theory is the probability of occurrence, which statistically predicts the probability of occurrence of a certain event.

Nonpatent Document 1

Asano Yoichiro, Suda Yoshinobu, "Introduction of a Fraudulent Use Detection System and Its Effects", Gekkan Syohishashinyo, Kinzai Institute for Financial Affairs Research Group, May 2000, pages 16-19.

When it is attempted to determine fraudulent use of a credit card based on Bayesian theory, factors such as the time, the amount, the store, and the like are extracted from the manner of use of the credit card, they are classified into various cases based on combinations of these factors, and by calculating the probability that fraud occurred based on past authorization data for each case, a probability of occurrence can be determined. In order to calculate the probability of occurrence, past authorization data are collected, and a model which classifies the data by case is prepared. In this model, the data are classified into as many cases as possible, and by collecting a large amount of authorization data for each case, the reliability of the probability of occurrence can be increased.

However, if there are too many cases resulting from various combinations of factors, the samples which are used as parameters become too few, or it becomes easy for irregular cases to influence calculation, so there are situations in which cases arise having a low reliability of the probability of occurrence. Cases which should not be employed in calculating the score are preferably treated as so-called noise and removed from analysis.

Meanwhile, even when a special value is calculated, it is not appropriate to remove such a value as noise. In order to calculate a score which suppresses the effect of noise and has a higher reliability, it is necessary to select, for the authorization data which is to be evaluated, a case which corresponds to a combination of factors which includes the most reliable data.

SUMMARY OF THE INVENTION

The object of this invention is to cope with such problems and to provide a fraud score calculating program which is effective in preventing a decrease in reliability of calculation of a score using a model prepared based on Bayesian theory, in calculation of a fraud score (a score used for fraud determination) for primarily with respect to the use of credit cards, which decrease in reliability would otherwise occur due to selection of inappropriate items.

Another object of this invention is to provide a fraud score calculating method.

Still another object of this invention is to provide a fraud score calculating system for credit cards which uses the score calculating program.

The present invention solves the above-described problems by providing a fraud score calculating program which causes a computer to perform a step of extracting factors contained in requested data for which score calculation is requested, a step of specifying a plurality of cases corresponding to combinations of the factors and obtaining the number of samples corresponding to each case from a storage device, a step of calculating a fraud score from the number of samples for each case, and a step of specifying a result of score calculation using at least one of the scores calculated for each case.

In the present invention, by calculating scores corresponding to a plurality of cases corresponding to combinations of the factors contained in the requested data and specifying a result of calculation, the risk of calculating a score for a case corresponding to so-called noise can be decreased compared to when the cases for combinations of factors are restricted to a single one. Here, a method of specifying a result of score calculation using at least one score includes a method of selecting an optimal value from a plurality of scores, a method of selecting at least two scores and calculating an average or the like, a method of calculating an average or the like of all the scores, and other methods.

The number of samples corresponding to each of the cases and the number of frauds in the number of samples are stored in the storage device. In the step of calculating the fraud score, the score may be calculated using the probability of the occurrence of fraud which is calculated using the number of samples and the number of frauds.

By storing the number of samples and the number of frauds therein for each case in a storage device such as a database, the probability of the occurrence of fraud for each corresponding case can be easily calculated, and the probability of the occurrence of fraud which is calculated in this manner can be used as a score of the possibility of fraud generally taking place for the corresponding case.

In the step of specifying the result of score calculation, the result of score calculation may be specified using an average of the scores calculated for each case.

With this structure, even if cases corresponding to so-called noise are included, by finding the average of a plurality of cases, the effect thereof can be decreased.

In the step of calculating the fraud score, the score can be calculated using the reliability of data accumulation reflecting the state of data accumulation of the number of samples or the number of frauds, and in the step of specifying the result of score calculation, the largest of the scores calculated for each case can be specified as the result of score calculation.

In this manner, when determining a score, by reflecting the reliability of data such as the number of samples which are the basis for score calculation, since items corresponding to so-called noise have a low reliability, the scores thereof are lowered. Accordingly, by employing the largest of the scores calculated for a plurality of cases, scores for cases having a low reliability can be removed from the result of calculation.

The fraud determination may be fraud determination for credit cards, the requested data may be authorization data, authorization data concerning past credit card use may be stored in the storage device, and the cases may be categorized according to factors contained in the authorization data.

With such a structure, the score calculating program according to the present invention can be used for determination of credit card fraud.

The present invention also provides a fraud score calculating method using a fraud score calculating program according to the present invention. In addition, it provides a credit card fraud score calculating system using a fraud score calculating program according to the present invention.

Namely, according to one aspect of the present invention, a fraud score calculating system comprises authorization data storing means which classifies authorization data on past credit card use according to cases and stores the number of samples contained in each case, new authorization data receiving means which receives new authorization data for performing fraud score calculation, sample number obtaining means for extracting factors contained in the new authorization data, specifying a plurality of cases corresponding to combinations of the factors, and obtaining the number of samples corresponding to each case from the authorization data storing means, score calculating means which calculates a fraud score from the number of samples for each case, and score-calculation-result specifying means for specifying a result of score calculation using at least one of the scores calculated for each case.

In the authorization data storing means, the number of samples and the number of frauds therein may be stored for each case, and the score calculating means may calculate the score using the probability of the occurrence of fraud which is calculated using the number of samples and the number of frauds.

The score-calculation-result specifying means may specify the result of score calculation using an average of the scores calculated for each case. The score calculating means may calculate the score using the reliability of data accumulation reflecting the state of data accumulation of the number of samples or the number of frauds, and the score-calculation-result specifying means may specify the largest of the scores calculated for each case as the result of score calculation.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 4 schematically illustrates an example of a number of samples recording table of the fraud detection model database of the fraud score calculating system according to the present invention;

FIG. 5 schematically illustrates an example of a case definition table of the fraud detection model database of the fraud score calculating system according to the present invention;

FIG. 6 schematically illustrates an example of the factor definition table of the fraud detection model database of the fraud score calculating system according to the present invention;

FIG. 8 schematically illustrates an example of specifying a plurality of corresponding cases from factors contained in authorization data by the fraud score calculating program according to the present invention;

FIG. 10 illustrates a concrete example of the score calculating formula reflecting the reliability.

DESCRIPTION OF PREFERRED EMBODIMENT

An embodiment of the present invention will be explained below in detail using the drawings. In the following explanation, the case will be explained in which a fraud score calculating program according to the present invention is used for determining the possibility of fraudulent use when the use of a credit card is accepted, but the present invention is not limited to such an embodiment.

Figure 1:
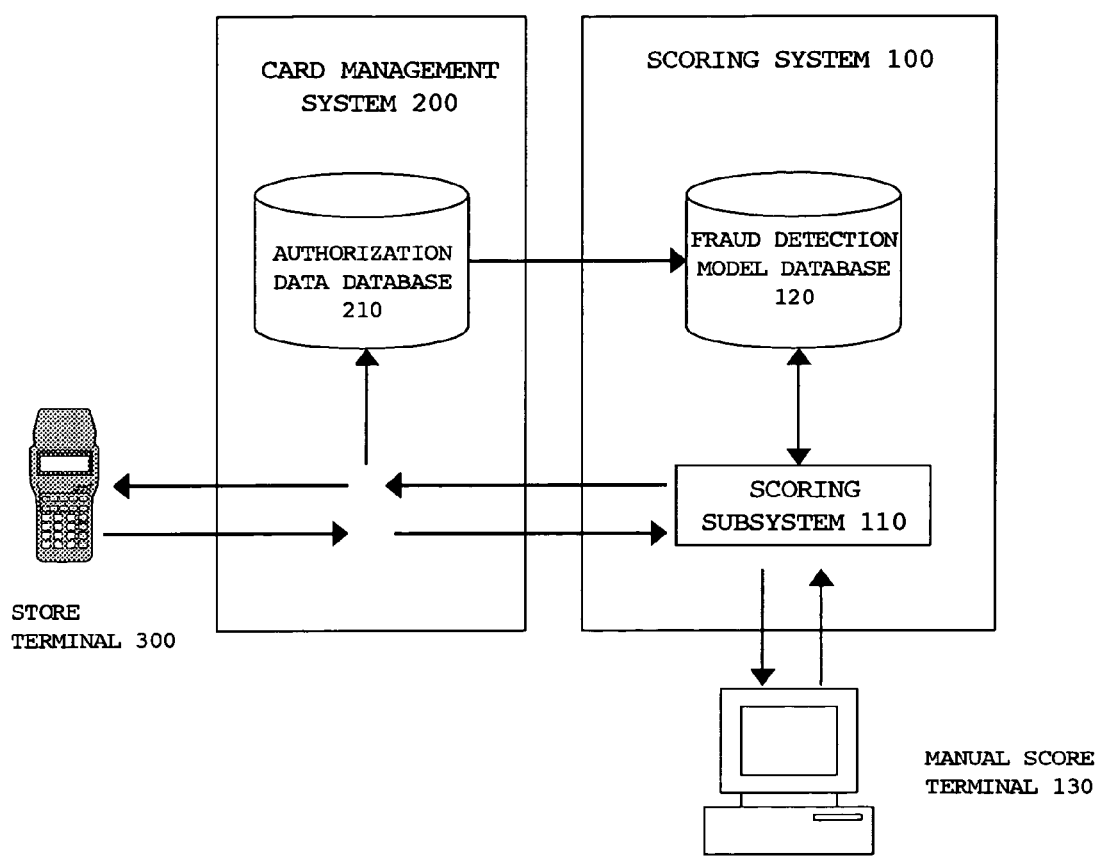
FIG. 1 is a block diagram of a fraud score calculating system for credit cards according to the present invention.

In FIG. 1, a scoring system 100 of the present invention comprises a scoring subsystem 110 and a fraud detection model database 120. It can be operated by a manual score terminal 130. The fraud detection model database 120 obtains authorization data from an authorization data database 210 of a card management system 200 which is managed by a credit card company. When there is an inquiry from a store terminal 300 at the time of credit card use, the scoring subsystem 110 determines a fraud score based on authorization data received through the card management system 200 and transmits the score to the card management system 200, and the card management system 200 sends the result of the inquiry based on the score to the store terminal 300.

Calculation of the score in the scoring subsystem 110 is carried out by referring to the fraud detection model database 120. The fraud detection model database 120 stores the number of samples and the number of frauds corresponding to cases which are classified based on factors, such as the time and the amount, contained in the authorization data. The scoring subsystem 110 obtains the number of samples and the number of frauds (hereinafter referred to as "sample number data") of cases corresponding to the authorization data for which a request for determination was received and calculates a score.

Figure 2:
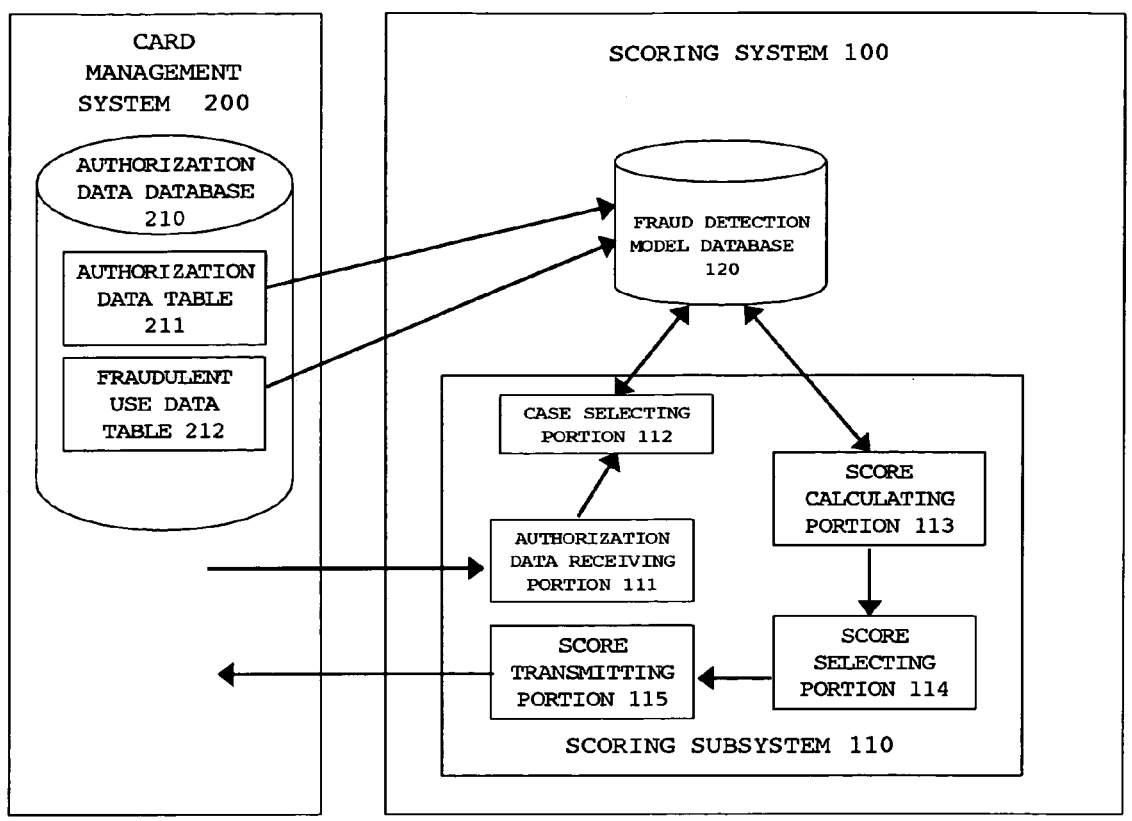
FIG. 2 is a block diagram showing the structure of the fraud score calculating system for credit cards according to the present invention in greater detail.

FIG. 2 shows the structure of a fraud score calculating system for credit cards according to the present invention in greater detail. The fraud detection model database 120 obtains authorization data from an authorization data table 211 of the authorization data database 210 in the card management system 200. For the authorization data which is obtained, the fraud detection model database 120 determines cases corresponding to each of factors such as the time and amount, and the number of samples is stored in the fraud detection model database 120. In addition, the fraud detection model database 120 obtains authorization data corresponding to fraudulent use from the fraudulent use data table 212 of the authorization data database 210 in the card management system 200. For the obtained authorization data, it makes a determination of the cases corresponding to each of the factors in the data such as the time and amount, and the number of samples corresponding to fraudulent use is stored in the fraud detection model database 120.

The scoring subsystem 110 has an authorization data receiving portion 111, a case selecting portion 112, a score calculating portion 113, a score selecting portion 114, and a score transmitting portion 115. When the authorization data receiving portion 111 receives authorization data for which a request for determination has been received, in the case selecting portion 112, the factors contained in the authorization data are extracted and a plurality of corresponding cases are specified by combinations of the factors, and the number of samples and the like corresponding to the cases are obtained with reference to the fraud detection model database 120. For each case, the score calculating portion 113 obtains the number of samples and the like from the fraud detection model database 120 and calculates a score. In the score selecting portion 114, a final result of score calculation is specified from the plurality of scores calculated in the score calculation portion 113 based on prescribed rules for removing the influence of noise. The score which is specified as the final result of score calculation is sent from the score transmitting portion 115 to the card management system 200.

Characteristic portions of the present invention are the case selecting portion 112 which selects a plurality of cases for score calculation from one set of authorization data, and the score selecting portion 114 which specifies a score, from which the effective noise is removed, from scores calculated for a plurality of cases. The former of these two extracts a plurality of factors from one set of authorization data and selects a plurality of cases corresponding to various combinations of factors.

In the latter, an average value of a plurality of calculated scores may be found, or a portion of the scores having a high reliability may be used. For example, the average of values in an intermediate range obtained by excluding an upper and lower fixed proportion of calculated values are used. If, for example, a value reflecting reliability which is based on the number of samples in corresponding cases is used as the score, the highest value of the plurality of calculated scores may be used. In general, if the number of samples is small, the results are dispersed and the reliability of data becomes poor. Furthermore, the more finely the cases are classified, the greater the number of cases, the number of samples per case decreases, and it is thought that there is a tendency for the reliability of data to decrease. Therefore, the reliability can be calculated for each case from the number of samples and the like which are recorded in the fraud detection model database 120.

Figure 3:
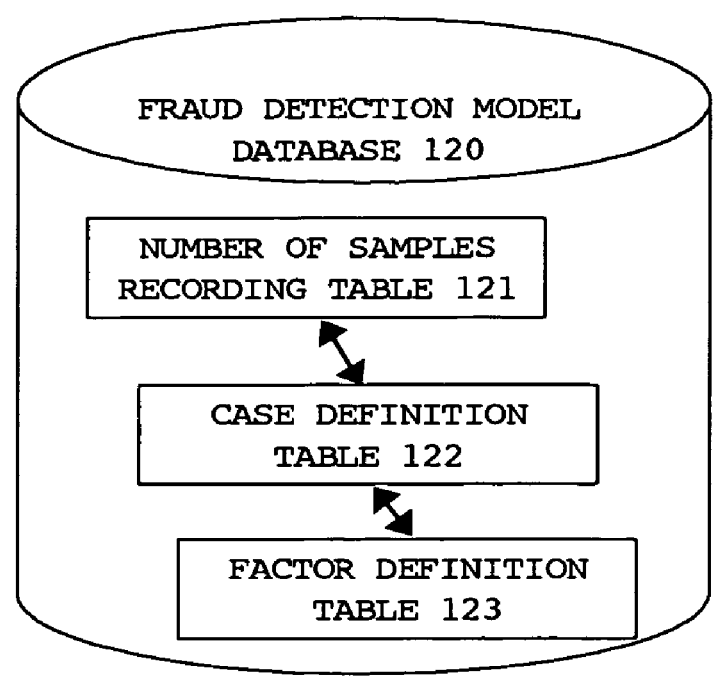
FIG. 3 is a block diagram showing the structure of a fraud detection model database in the fraud score calculating system according to the present invention.

Next, using FIGS. 3-6, a method of recording various cases in the fraud detection model database 120 will be explained. FIG. 3 shows the structure of the fraud detection model database 120. The fraud detection model database 120 has a number of samples recording table 121, a case definition table 122, and a factor definition table 123.

FIG. 4 shows an example of the number of samples recording table 121. In the number of samples recording table 121, in a record provided for each case, the number of samples of authorization data corresponding to each case and, out of these, the number of samples corresponding to fraudulent use are recorded.

FIG. 5 shows an example of the case definition table 122. In the case definition table 122, in the record provided for each case, the combination of factors corresponding to the case is defined. The combinations of factors are not limited to those in which all of factors A-C are specified, and they include combinations in which only a portion of the factors are specified, such as one in which only factor A is specified and the other factors are not specified, or one in which factor A and factor B are specified and factor C is not specified. Therefore, one set of authorization data corresponds not to one case but to a plurality of cases.

FIG. 6 shows an example of the factor definition table 123. In the factor definition table 123, in the records provided for each category of factor, the contents of factors corresponding to each category are defined. In this example, factor A corresponds to the transaction amount contained in the authorization data, and for each category, the range of the transaction amount is defined. Factor B corresponds to the transaction time contained in the authorization data, and for each category, the range of the transaction time is defined. Factor C corresponds to the sex of the user contained in the authorization data, and for each category, the sex is defined.

Figure 7:
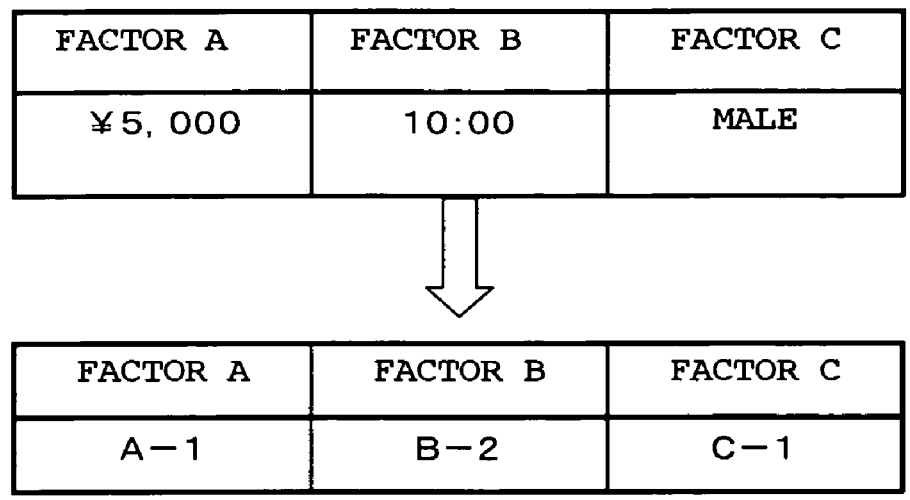
FIG. 7 schematically illustrates an example of specifying factors contained in authorization data in a fraud score calculating program according to the present invention.

When the fraud detection model database 120 is structured as in the examples of FIGS. 3-6, if the authorization data shown in FIG. 7 is received, the following processing takes place. FIG. 7 shows an example in which a male uses a credit card at 10 AM for 5,000 yen. In this example, factor A is 5,000 yen, so it falls into category A-1. Factor B is 10 AM, so it falls into category B-2. Factor C is male, so it falls into category C-1.

For the extracted factors A-1, B-2, and C-1, the following 7 combinations can be created.

A-1
B-2
C-1
A-1 and B-2
A-1 and C-1
B-2 and C-1
A-1 and B-2 and C-1

Each of these combinations is a case corresponding to this set of authorization data, so a score is calculated for each of these combinations, and using the 7 calculated scores, a final result of score calculation is determined. For example, when there happens to be one data sample of fraudulent use for the combination "A-1 and B-2 and C-1", if only this data is used, there is the danger of an extremely high score being calculated, but by using a method in which the average of 7 scores is used, or a method in which the largest and smallest values among the 7 are thrown out, it is possible to remove the effect of so-called noise due to irregular cases which are preferably not reflected in the score.

FIG. 8 shows an example of specifying corresponding cases in the case definition table 122 for the combinations of factors contained in the authorization data. The above-described 7 combinations correspond to the 7 records shown in FIG. 8. A score can be calculated for each case by obtaining the number of samples and the like for each corresponding case from the number of samples recording table 121.

When calculating the scores for a plurality of cases in this manner, if the score calculating formula itself is set so as to reflect the reliability of the data, if the score having the highest value of the plurality of calculated scores is used, the selection is the most conservative with respect to the possibility of fraud, and a score having a high reliability can be determined.

Figure 9:
FIG. 9 is a block diagram illustrating the theory of a score calculating formula reflecting reliability.

In order to reflect the reliability of data in the score calculating formula itself, by employing the concept shown in FIG. 9, for example, a calculating formula shown in the example of FIG. 10 can be used. The symbols used in FIG. 10 have the following meanings.

A: the number of accumulated data samples
B: the number of data samples in the accumulated data for which fraudulent use was determined
C: the number of data samples in a case matching the received authorization data
D: the number of fraud samples in the case matching the received authorization data
$\alpha$: the number of cases included in the accumulated data
$\beta$: the number of cases for which a determination of fraudulent use was made out of the cases corresponding to the accumulated data
X: a score showing the possibility of fraudulent use As shown in FIG. 9, which illustrates the theory of a score calculating formula, the score is calculated by multiplying the probability of the occurrence of fraud by the reliability, the first the probability of the occurrence of fraud is calculated. Specifically, as shown by the example in FIG. 10, it is found by dividing the number of samples of fraudulent use by the total number of data samples in each case matching the received authorization data. In the formula for calculating the probability of occurrence, 1 is added to the denominator and ½ is added to the numerator.

Next, the reliability is calculated. For the reliability, an empirical value for accumulation of all data may be used, or an empirical value for accumulation of data pertaining to fraudulent use may be used. Alternatively, a value obtained by multiplying the two may be used.

Specifically, as shown in the example of FIG. 10, the reliability may be found by subtracting, from 1, a value obtained by dividing the number of cases contained in the accumulated data by the total number of samples in the accumulated data, or a value obtained by dividing the number of cases for which a determination of fraudulent use was made by the total number of data samples for which a determination of fraudulent use was made. According to such a formula, as the number of accumulated data samples increases, or as the number of data samples included in each case increases, the higher is the value to which the reliability can be set.

The value used for reliability can be either an empirical value for data accumulation of all data or an empirical value for data accumulation of data related to fraudulent use, either of which is calculated as described above, but in order to perform more accurate calculation of reliability, it is preferable to use a value obtained by multiplying both values.

Figure 11:
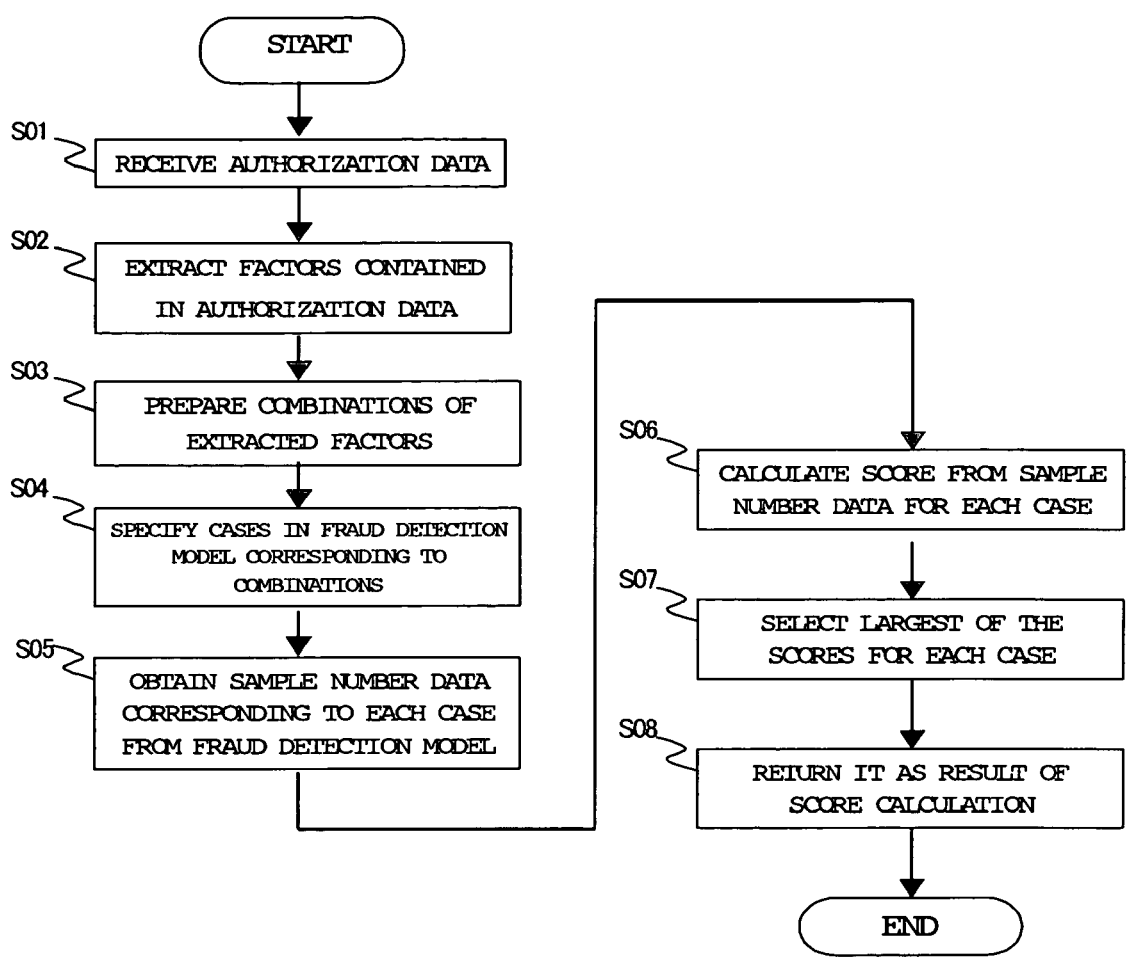
FIG. 11 is a flow chart of a fraud score calculating program according to the present invention.

The flow of the fraud score calculating program according to the present invention will be explained using the flow chart of FIG. 11. First, authorization data for which a request for a score relating to the probability of fraud was made is received from the system of the credit card company or the like (S01). From the authorization data which was received, the factors contained therein are extracted (S02), and combinations are created for the extracted factors (S03).

Next, the cases corresponding to the created combinations are specified in the fraud detection model (S04). When the corresponding cases are specified, for each case, the number of samples of data for the corresponding case and, of those, the number of samples of data for which there was fraudulent use are obtained from the fraud detection model (S05). From the sample number data, a score is calculated for each case (S06). When the score reflects the reliability of the sample number data, the largest score is selected (S07) and is sent to the system of the credit card company or the like as the result of score calculation (S18).

According to the present invention, in the calculation of a score using a model prepared based on Bayesian theory in the calculation of a fraud score primarily with respect to use of credit cards and the like, the risk of calculating a score affected by so-called noise in the form of irregular cases which are undesirable for inclusion in the score can be decreased.

Obviously, numerous modifications and variations of the present invention are possible in light of the above teachings. It is therefore to be understood that within the scope of the appended claims, the present invention may be practiced otherwise than as specifically described herein.

What is claimed is:

1. A fraud score calculating program embodied on a computer readable medium when executed by a computer, the program is configured to perform the steps of:
    extracting factors contained in requested data for which score calculation is requested,
    specifying a plurality of cases corresponding to combinations of the factors and obtaining the number of samples corresponding to each case from a storage device,
    calculating a fraud score from the number of samples for each case, wherein the fraud score equals a probability of fraud occurrence multiplied by a reliability of data accumulation, and wherein the fraud score is calculated using the reliability of data accumulation reflecting an empirical value for data accumulation of the number of samples, and
    specifying a result of fraud score calculation using the largest of the fraud scores calculated for each case.

2. A fraud score calculating program as claimed in claim 1, wherein the number of samples corresponding to each case and the number of frauds contained in the number of samples are stored in the storage device, and in the step of calculating the fraud score, the fraud score is calculated using the probability of the occurrence of fraud which is calculated using the number of samples and the number of frauds.

3. A fraud score calculating program as claimed in claim 2, wherein in the step of calculating the fraud score, the fraud score is calculated using the reliability of data accumulation which reflects an empirical value for data accumulation of the number of frauds.

4. A fraud score calculating method comprising:
   extracting factors contained in requested data for which score calculation is requested,
   specifying a plurality of cases corresponding to combinations of the factors and obtains the number of samples corresponding to each case from a storage device,
   calculating a fraud score from the number of samples for each case, wherein the fraud score equals a probability of fraud occurrence multiplied by a reliability of data accumulation, and wherein the fraud score is calculated using the reliability of data accumulation reflecting an empire value for data accumulation of the number of samples, and
   specifying a result of fraud score calculation using the largest of the fraud scores calculated for each case.

5. A fraud score calculating method as claimed in claim 4 wherein the number of samples corresponding to each case and the number of frauds contained in the number of samples are stored in the storage device, and the fraud score is calculated using the probability of the occurrence of fraud which is calculated using the number of samples and the number of frauds.

6. A fraud score calculating method as claimed in claim 5 wherein the fraud score is calculated using the reliability of data accumulation which reflects an empirical value for data accumulation of the number of frauds.

7. A credit card fraud score calculating system comprising:
   authorization data classifier and storage configured to classify authorization data on past credit card use into cases and to store the number of samples contained in each case,
   new authorization data receiver configured to receive new authorization data for performing fraud score calculation,
   sample number extractor configured to extract factors contained in the new authorization data,
   a specifier configured to specify a plurality of cases corresponding to combinations of the factors, and to obtain the number of samples corresponding to each case from the authorization data,
   fraud score calculator configured to calculate a fraud score from the number of samples for each case, wherein the fraud score equals a probability of fraud occurrence multiplied by a reliability of data accumulation, and wherein the fraud score is calculated using the reliability of data accumulation reflecting an empire value for data accumulation of the number of samples, and
   fraud score-calculation-result specifier configured to specify a result of fraud score calculation using the largest of the fraud scores calculated for each case.

8. A fraud score calculating system as claimed in claim 7 wherein the number of samples corresponding to each case and the number of frauds contained in the number of samples are stored in the authorization data storage, and the fraud score calculator calculates the fraud score using the probability of the occurrence of fraud which is calculated using the number of samples and the number of frauds.

9. A fraud score calculating system as claimed in claim 8 wherein the fraud score calculator calculates the fraud score using the reliability of data accumulation reflecting an empirical value for data accumulation of the number of frauds.

* * * * *

UNITED STATES PATENT AND TRADEMARK OFFICE
CERTIFICATE OF CORRECTION

| | |
|---|---|
| PATENT NO. | : 7,386,506 B2 |
| APPLICATION NO. | : 10/747042 |
| DATED | : June 10, 2008 |
| INVENTOR(S) | : Aoki et al. |

It is certified that error appears in the above-identified patent and that said Letters Patent is hereby corrected as shown below:

On the Title Page please add item 30.

Foreign Application Priority Data

May 7, 2003 (JP) ....... 2003-129411

Column 9, line 7 (claim 4, line 5), "obtains" should read -- obtaining --;
and line 15 (claim 4, line 13) "empire" should read -- empirical --.

Column 10, line 15 (claim 7, line 21) "empire" should read -- empirical --.

Signed and Sealed this

Seventh Day of April, 2009

JOHN DOLL
*Acting Director of the United States Patent and Trademark Office*